(12) United States Patent
Mills (10) Patent No.: US 7,228,872 B2
(45) Date of Patent: Jun. 12, 2007

(54) NITROUS OXIDE AND FUEL CONTROL VALVE FOR NITROUS OXIDE INJECTION SYSTEM

(76) Inventor: Douglas W. Mills, P.O. Box 635, Alachua, FL (US) 32616

( * ) Notice: Subject to any disclaimer, the term of this patent is extended or adjusted under 35 U.S.C. 154(b) by 332 days.

(21) Appl. No.: 11/037,937

(22) Filed: Jan. 18, 2005

(65) Prior Publication Data

US 2006/0157106 A1 Jul. 20, 2006

(51) Int. Cl.
*F16K 11/04* (2006.01)
(52) U.S. Cl. .................................. 137/595; 137/607
(58) Field of Classification Search ............. 137/595 I, 137/607 X
See application file for complete search history.

(56) References Cited

U.S. PATENT DOCUMENTS

| | | | |
|---|---|---|---|
| 1,435,921 A * | 11/1922 | Grossenbacher | ............ 137/595 |
| 1,551,651 A * | 9/1925 | Everhart | ..................... 137/595 |
| 2,116,806 A * | 5/1938 | Zinkil et al. | ................ 137/607 |
| 2,810,259 A * | 10/1957 | Burdett, Jr. | ............ 137/625.37 |
| 3,592,357 A | 7/1971 | Welch | |
| 4,683,843 A | 8/1987 | Norcia et al. | |
| 5,063,898 A | 11/1991 | Elliott | |
| RE35,101 E | 11/1995 | Kelly | |
| 5,870,996 A | 2/1999 | DeLuca | |
| 6,073,862 A | 6/2000 | Touchette et al. | |
| 6,116,225 A | 9/2000 | Thomas et al. | |
| 6,520,165 B1 | 2/2003 | Steele | |
| 6,691,688 B1 | 2/2004 | Chestnut | |

* cited by examiner

*Primary Examiner*—Stephen M. Hepperle
(74) *Attorney, Agent, or Firm*—The Living Firm; Edward M. Livingston; Angela M. Miller (57) ABSTRACT

A nitrous oxide and fuel control valve has simultaneous flow control of nitrous oxide from a first fluid-delivery aperture (8) and flow control of fuel from a second fluid-delivery aperture (10) into a mixing nozzle (38) of an intake manifold of an engine by simultaneous actuation of an activation T-bar (18) with an actuation piston (26) that is actuated with gas pressure from an actuation-pressure source (43) with an actuation on/off solenoid valve (44). It can be structured for low-weight, short-term needs for racing and other sports uses or for heavier long-term needs of engines.

17 Claims, 5 Drawing Sheets

NITROUS OXIDE AND FUEL CONTROL VALVE FOR NITROUS OXIDE INJECTION SYSTEM

BACKGROUND OF THE INVENTION

This invention relates to nitrous oxide injection systems, more particularly, to a valve which controls the introduction of nitrous oxide and fuel to a mixing nozzle prior to injection into a manifold of an internal-combustion engine for enhancing effective pressure of subsequent combustion of the engine for racing and other enhanced-power uses.

Nitrous-oxide injector systems for enhancing power of internal-combustion engines are well known. None, however, are known to provide the introduction and control of nitrous oxide and fuel with a single actuator of separate flows of both nitrous oxide and fuel in a manner taught by this invention.

Related but different prior art is known to include the following:

| Patent Number | Inventor | Issue/Publication Date |
|---|---|---|
| U.S. Pat. No. 3,592,357 | Welch | Jul. 13, 1971 |
| U.S. Pat. No. 4,683,843 | Norcia et al. | Aug. 4, 1987 |
| U.S. Pat. No. 5,063,898 | Elliott | Nov. 12, 1991 |
| U.S. Pat. No. Re. 35,101 | Kelly | Nov. 28, 1995 |
| U.S. Pat. No. 5,870,996 | DeLuca | Feb. 16, 1999 |
| U.S. Pat. No. 6,073,862 | Touchette et al. | Jun. 13, 2000 |
| U.S. Pat. No. 6,116,225 | Thomas et al. | Sep. 12, 2000 |
| U.S. Pat. No. 6,520,165 B1 | Steele | Feb. 18, 2003 |
| U.S. Pat. No. 6,691,688 B1 | Chestnut | Feb. 17, 2004 |

SUMMARY OF THE INVENTION

Objects of patentable novelty and utility taught by this invention are to provide a nitrous oxide and fuel control valve which:

uses less electricity;

has less weight;

can control the flow simultaneously of separate liquid or gaseous fluids;

can be repaired or replaced rapidly, easily and accurately;

can be powered with low-weight and simple power systems; and provides engine protection from excess heat and/or detonation by shutting off both fuel and nitrous oxide in the event of its failure.

This invention accomplishes these and other objectives with a nitrous oxide and fuel control valve having both nitrous oxide flow circuit from a first valve and fuel flow circuit from a second valve by simultaneous actuation of an activation T-bar with an actuation piston that is actuated with gas pressure from a low-weight actuation-pressure container controlled by a small electrical solenoid valve of low power consumption and low weight and capable of activating one or more nitrous oxide and fuel control valves taught by the present invention. The nitrous oxide is supplied by a low-weight pre-pressured first fluid container while the fuel is supplied by a mechanized pump or an electrical pump.

A poppet valve for each of two separate flow circuits, one for the oxidizer (generally nitrous oxide) and one for fuel, both flowing into the same mixing nozzle(s), are actuated simultaneously by a single actuation T-bar with gas pressure to a pneumatic piston. The oxidizer and fuel are both under pressure for controlled release into the mixing nozzle(s) by opening of valves for the separate circuits at the same time.

Prior art nitrous oxide injection systems employ a first separate, heavy and high-current consumption solenoid valve controlling the flow of the oxidizer and a second separate, heavy and high-current solenoid valve for injection of fuel into a mixing nozzle for injection into an intake manifold of an engine. Accordingly, in proportion to increased engine power achieved by oxidizer injection systems, the combined weight of present systems is approximately two to three times greater and electrical-current consumption can be as much as one-hundred times greater than with this invention.

Additionally, piping and plumbing are simplified by single instead of double connection to valve bodies.

Also, significant engine protection results from inherent shutoff of both oxidizer and fuel from valve failure.

BRIEF DESCRIPTION OF DRAWINGS

This invention is described by appended claims in relation to description of a preferred embodiment with reference to the following drawings which are explained briefly as follows:

DESCRIPTION OF PREFERRED EMBODIMENT

A description of the preferred embodiment of this invention follows a list of numbered terms which designate its features with the same numbers on the drawings and in parentheses throughout the description and throughout the patent claims.

1. First valve-stem guide
2. Second valve-stem guide
3. Valve housing
4. First inlet aperture
5. First fluid-supply aperture
6. First valve aperture seat -continued 7. First outlet aperture
8. First fluid-delivery aperture
9. Second inlet aperture
10. Second fluid-supply aperture
11. Second valve aperture seat
12. Second outlet aperture
13. Second fluid-delivery aperture
14. First valve
15. First valve stem
16. Second valve
17. Second valve stem
18. Activation T-bar
19. Injection activator
20. First adjuster
21. Second adjuster
22. First expansion-pressure spring
23. First spring base
24. Second expansion-pressure spring
25. Second spring base
26. Actuator piston
27. Actuator cylinder
28. Actuator stem
29. Actuation-fluid conveyance
30. Adjustment threads
31. First rotary nut
32. Second rotary nut
33. First jam nut
34. Second jam nut
35. First fluid-supply conveyance
36. First fluid container
37. First fluid-injection conveyance
38. Mixing nozzle
39. Second fluid-supply conveyance
40. Second fluid container
41. Second fluid-injection conveyance
42. Actuation-fluid conveyance
43. Actuation-pressure source
44. Actuation on/off solenoid valve
45. Nitrous oxide and fuel control valve
46. Adjustment space
47. Valve cover Referring to FIGS. 1-6 and to FIGS. 8-10, the nitrous oxide and fuel control valve 45 has at least one first valve-stem guide 1 and at least one second valve-stem guide 2 in a valve housing 3. A first inlet aperture 4 is in fluid communication from a first fluid-supply aperture 5 in the valve housing 3 to a first valve aperture 6 in the valve housing 3. A first outlet aperture 7 is in fluid communication from the first valve aperture 6 to a first fluid-delivery aperture 8 in the valve housing 3. A second inlet aperture 9 is in fluid communication from a second fluid-supply aperture 10 in the valve housing 3 to a second valve aperture 11 in the valve housing 3. A second outlet aperture 12 is in fluid communication from the second valve aperture 11 to a second fluid-delivery aperture 13 in the valve housing 3.

A first valve 14 is positioned on a first valve stem 15. The first valve stem 15 is reciprocatable within an internal periphery of the first valve-stem guide 1. The first valve 14 is structured for opening and closing the first outlet aperture 7 with the first valve stem 15 predeterminedly.

A second valve 16 is positioned on a second valve stem 17. The second valve stem 17 is reciprocatable within an internal periphery of the second valve-stem guide 2. The second valve 16 is structured for opening and closing the second outlet aperture 12 with the second valve stem 17 predeterminedly.

An activation T-bar 18 is positioned proximate activation ends of the first valve stem 15 and the second valve stem 17. An injection activator 19 is in communication with the activation T-bar 18 with the injection activator 19 being structured for actuating the activator T-bar 18 predeterminedly for actuation of the first valve 14 with the first valve stem 15 and for actuation of the second valve 16 with the second valve stem 17.

The first and second valves, 14 and 16 respectively, have two separate circuits (two supply apertures or ports, 4 and 9, two outlet apertures, 7 and 12), operate simultaneously, with each circuit capable of controlling the flow of a gas or liquid, at high or low pressure, or a vacuum. This flow of gas or liquid is stopped(i.e., the valves 14 and 16 are OFF when the valve stems 15 and 17, having compliant material on a lower end, such as Viton, Neoprene, Teflon, or similar polymer) are held against first and second valve outlet aperture seats 6 and 11, respectively, by the expansive force of the springs, 22 and 24. The flow of gas or liquid is initiated, i.e., the valves 14 and 16 are ON, when the valve stems 15 and 17 are simultaneously lifted off, or above, the valve outlet aperture seats 6 and 11.

The first fluid-supply aperture 5 is structured for receiving a first fluid under pressure for directing the first fluid to the first outlet aperture 7. The second fluid-supply aperture 10 is formed to receive a second fluid under pressure for directing the second fluid to the second outlet aperture 12.

The first valve 14 can be a poppet valve structured on a valve end of the first valve stem 15 for closing and opening the first outlet aperture 7 predeterminedly and the second valve 16 can be a poppet valve structured on a valve end of the second valve stem 17 for closing and opening the second outlet aperture 12 predeterminedly. A poppet valve is intended to include a class of valves which plug openings to apertures predeterminedly.

A linear axis of the first outlet aperture 7 is orthogonal to a linear axis of the first fluid-supply aperture 5. A linear axis of the first valve 14, the linear axis of the first outlet aperture 7 and a linear axis of the first valve stem 15 are collinear. The linear axis of the first outlet aperture 7 is orthogonal to a linear axis of the first fluid-delivery aperture 8.

A linear axis of the second outlet aperture 12 is orthogonal to a linear axis of the second fluid-supply aperture 10. A linear axis of the second valve 16, the linear axis of the second outlet aperture 12 and a linear axis of the second valve stem 17 are collinear. The linear axis of the second outlet aperture 12 is orthogonal to a linear axis of the second fluid-delivery aperture 13.

A first expansion-pressure spring 22 is positioned with expansion pressure intermediate a first spring base 23 proximate an activation end of the first valve-stem guide 1 and the first valve 14 for spring-pressing the first valve 14 closed and for allowing predetermined inlet pressure of the first fluid to open the first valve 14 for fluid communication intermediate the first inlet aperture 4 and the first outlet aperture 7. A second expansion-pressure spring 24 is positioned with expansion pressure intermediate a second spring base 25 proximate an activation end of the second valve-stem guide 2 and the second valve 16 for spring-pressing the second valve 16 closed and for allowing predetermined inlet pressure of the second fluid to open the second valve 16 for fluid communication intermediate the second inlet aperture 9 and the second outlet aperture 12.

The injection activator 19 can include an actuator piston 26 in sliding-seal contact with an inside periphery of an actuator cylinder 27 in the valve housing 3. The actuator cylinder 27 has a linear axis collinear to and intermediate the first valve-stem guide 1 and the second valve-stem guide 2. An actuator stem 28 is extended perpendicularly from the actuator piston 26 to rigid contact with the actuation T-bar

18. An actuation-fluid conveyance 29 is positioned in fluid communication with a pressure-actuation end of the actuator cylinder 27.

The pressure-actuation end of the actuator cylinder 27 is opposite a stem end of the actuator piston 26 for actuating travel of the activation T-bar 18 in a valve-opening direction.

The first valve stem 15 and the second valve stem 17 can include adjustment threads 30 on activator ends thereof.

Figure 8:
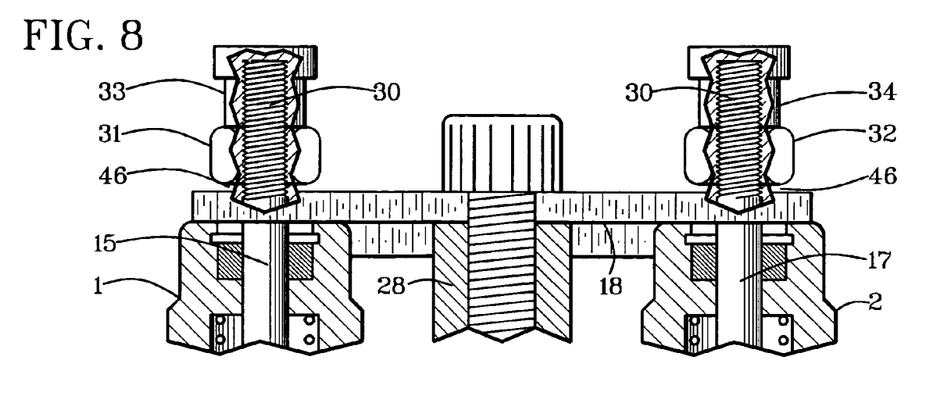
FIG. 8 is a partially cutaway enlarged fragmentary view of an activation T-bar in relationship to adjustors in a valve-closed mode when valve stem can be adjusted.
Figure 9:
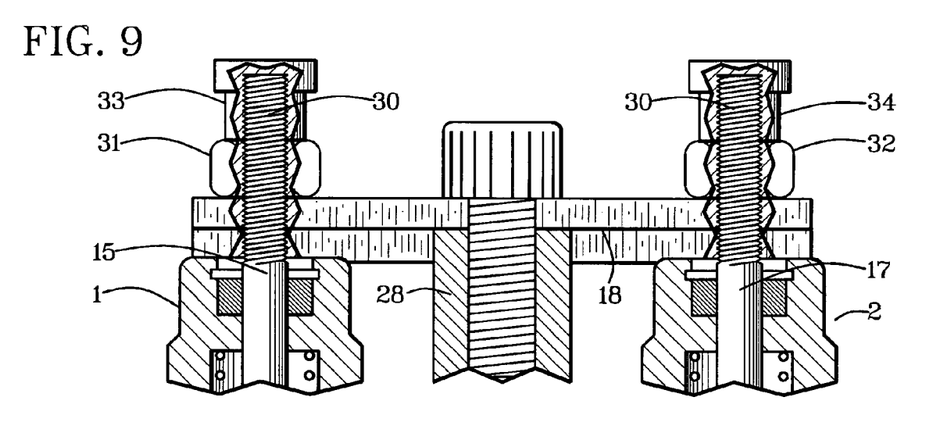
FIG. 9 is a partially cutaway enlarged fragmentary view of the activation T-bar in relationship to adjustors in a valve-open mode.
Figure 10:
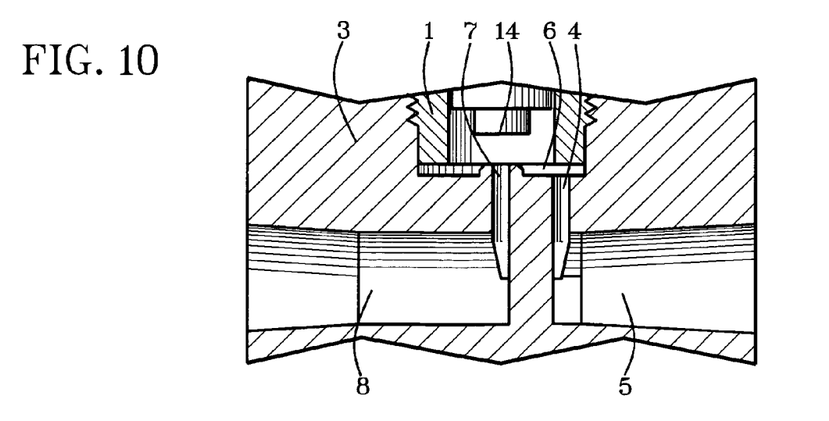
FIG. 10 is a partially cutaway enlarged fragmentary view of the valve portion of the first valve in a valve-open mode.

A first rotary nut 31 and first jam nut 33 are screw-positioned on the threads 30 of the first valve stem 15 at a distance from an adjustment-nut side of the activation T-bar 18 to secure the first valve stem 15.

A second rotary nut 32 and jam nut 34 are screw-positioned on the threads 30 of the second valve stem also to secure the activation T-bar 18 to the second valve stem 17.

A valve cover 47 can be placed over the activation T-bar 18 and nuts 31 and 32.

Figure 1:
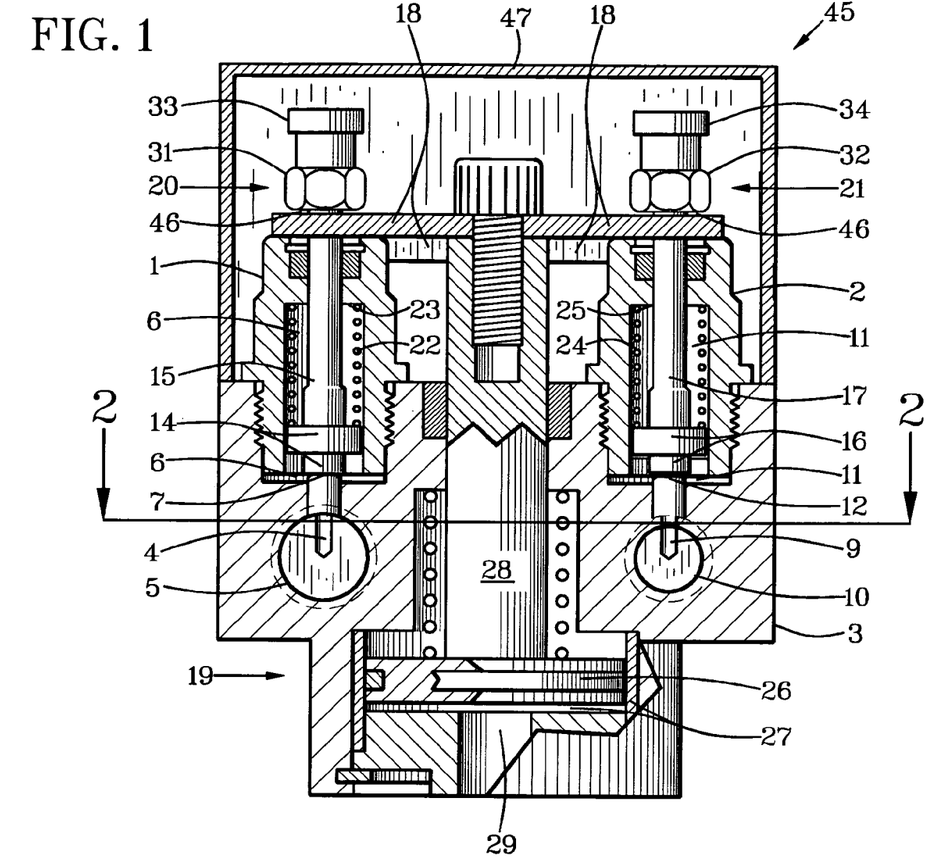
FIG. 1 is a partially cutaway side view of the invention in a valve-closed mode.
Figure 2:
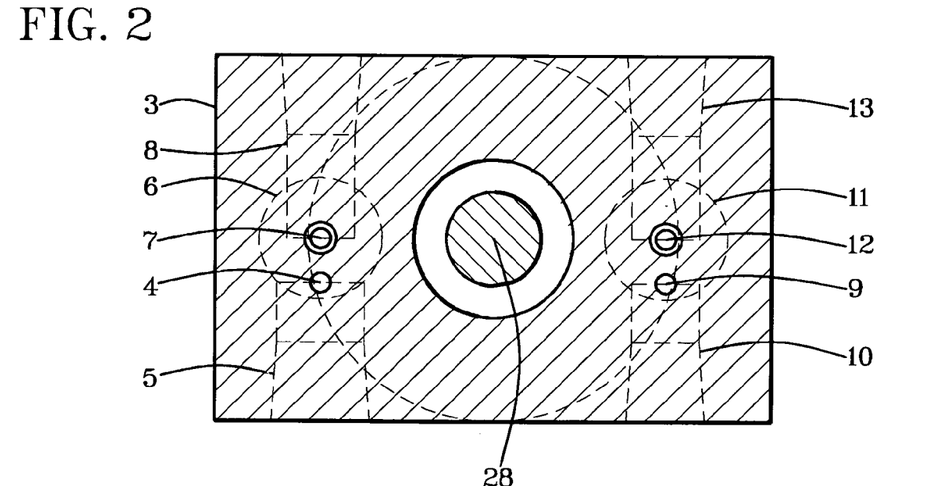
FIG. 2 is a cross-section view of valve apertures through section line 2-2 in FIG. 1.
Figure 3:
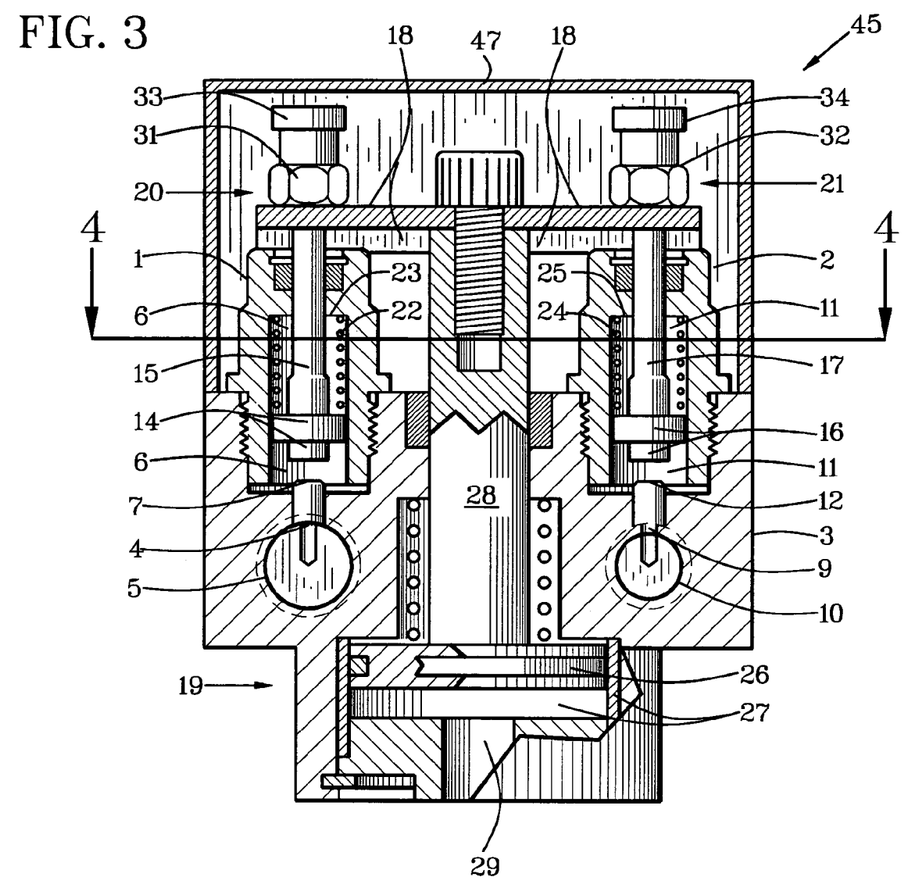
FIG. 3 is a partially cutaway side view of the invention in a valve-open mode.
Figure 4:
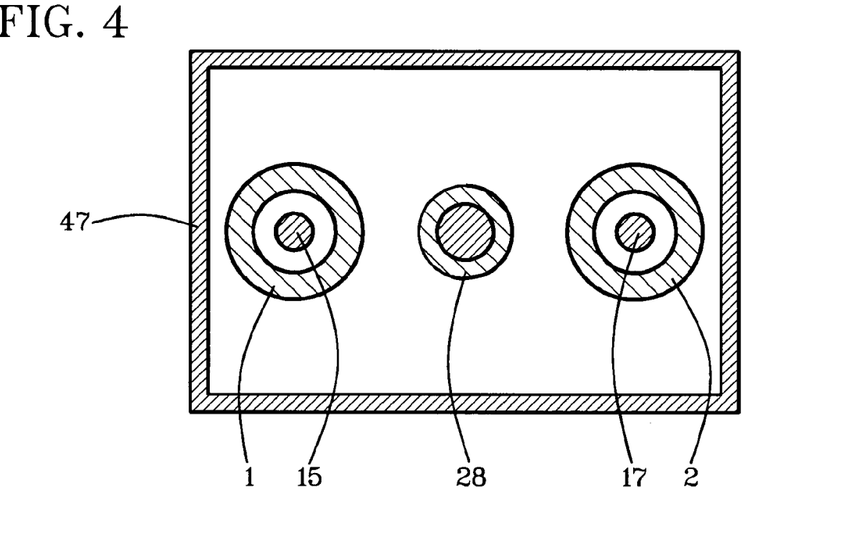
FIG. 4 is a cross-section view of valve stems and an actuator stem through section line 4-4 in FIG. 3.
Figure 5:
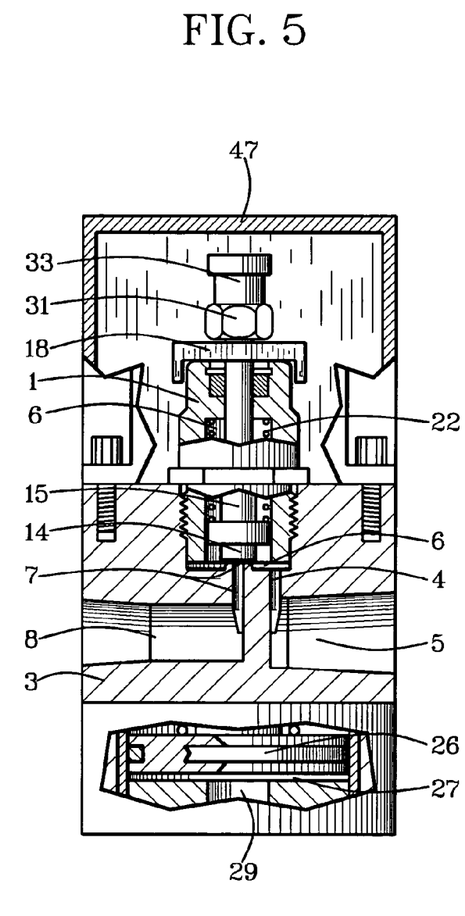
FIG. 5 is a partially cutaway first-end view of the invention with a first valve in a valve-closed mode.
Figure 6:
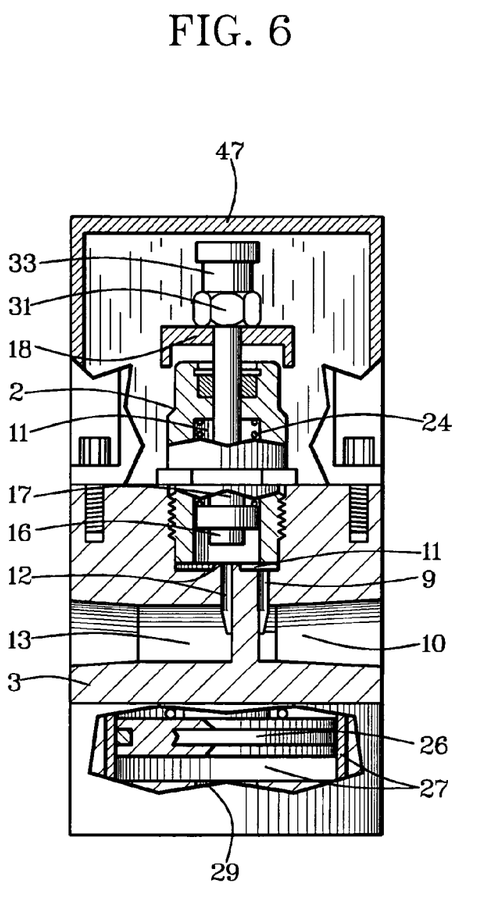
FIG. 6 is the partially cutaway first-end view of the invention with a second valve in a valve-open mode.
Figure 7:
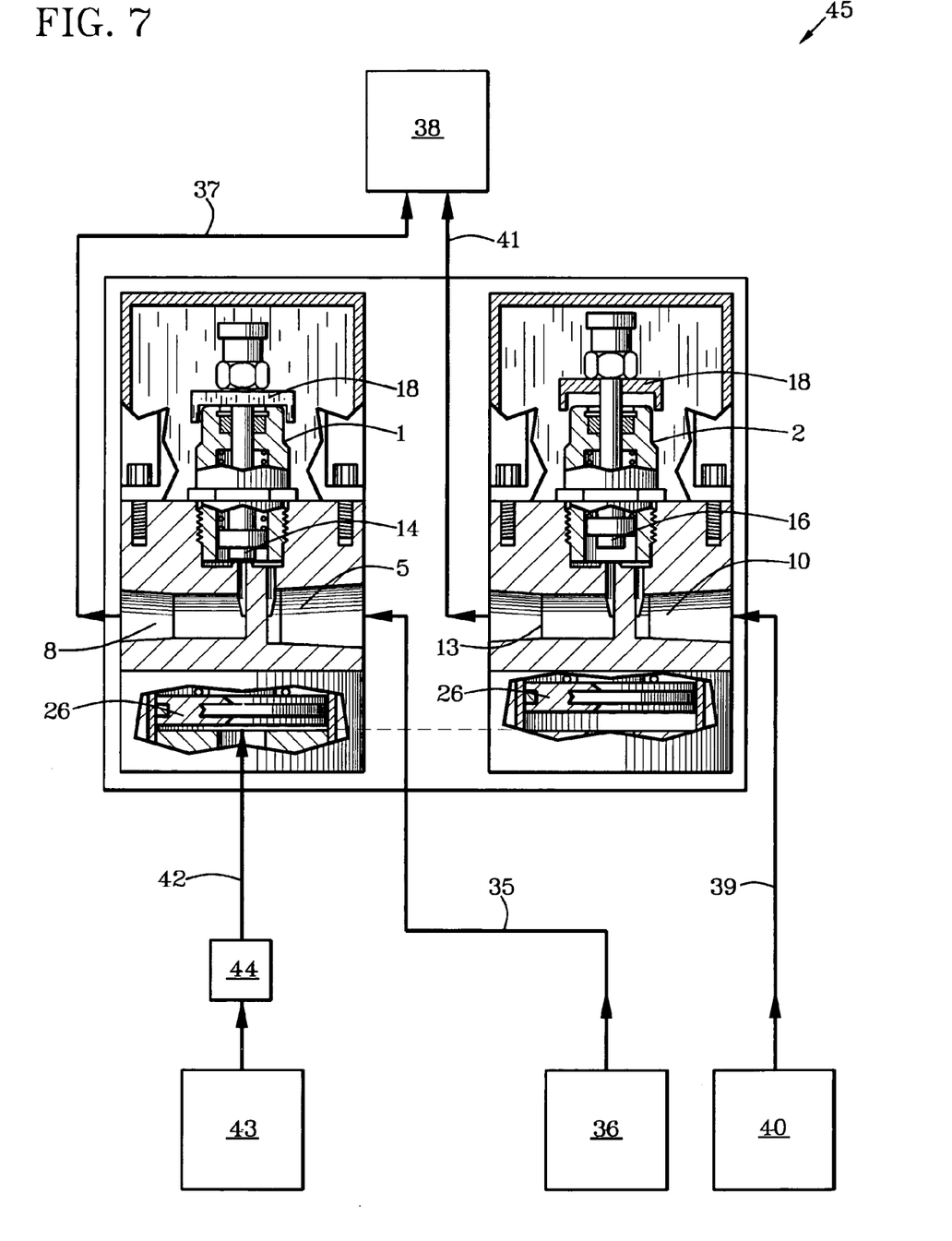
FIG. 7 is a partially cutaway plan view of the invention showing juxtaposed end views of a first valve open and a second valve closed and with addition of system interface features.

Referring further to FIGS. 1-6 and to FIG. 7, comprehensively for use on an engine, the nitrous oxide and fuel control valve 45, has at least the one first valve-stem guide 1 and at least the one second valve-stem guide 2 in the valve housing 3. The first inlet aperture 4 is in fluid communication from the first fluid-supply aperture 5 in the valve housing 3 to the first valve aperture 6 in the valve housing 3.

The first outlet aperture 7 is in fluid communication from the first valve aperture 6 to the first fluid-delivery aperture 8 in the valve housing 3. The second inlet aperture 9 is in fluid communication from the second fluid-supply aperture 10 in the valve housing 3 to the second valve aperture 11 in the valve housing 3. The second outlet aperture 12 in fluid communication from the second valve aperture 11 to the second fluid-delivery aperture 13 in the valve housing 3.

The first valve 14 is positioned on the first valve stem 15. The first valve stem 15 is reciprocatable within the internal periphery of the first valve-stem guide 1.

The first valve 14 is structured for opening and closing the first outlet aperture 7 with the first valve stem 15.

The second valve 16 is positioned on the second valve stem 17. The second valve stem 17 is reciprocatable within the internal periphery of the second valve-stem guide 2. The second valve 16 is structured for opening and closing the second outlet aperture 12 with the second valve stem 17.

The activator T-bar 18 is positioned proximate activation ends of the first valve stem 15 and the second valve stem 17. The injection activator 19 is in communication with the activation T-bar 18.

The first fluid-supply aperture 5 is structured for receiving the first fluid under pressure for directing the first fluid to the first outlet aperture 7. The second fluid-supply aperture 10 is formed to receive the second fluid under pressure for directing the second fluid to the second outlet aperture 12.

The first valve 14 is a poppet valve structured on the valve end of the first valve stem 15 for closing and opening the first outlet aperture 7 predeterminedly;

The second valve 16 is a poppet valve structured on the valve end of the second valve stem 17 for closing and opening the second outlet aperture 12.

The linear axis of the first outlet aperture 7 is orthogonal to the linear axis of the first fluid-supply aperture 5. The linear axis of the first valve 14, the linear axis of the first outlet aperture 7 and the linear axis of the first valve stem 15 are collinear. The linear axis of the first outlet aperture 7 is orthogonal to the linear axis of the first fluid-delivery aperture 8.

The linear axis of the second outlet aperture 12 is orthogonal to the linear axis of the second fluid-supply aperture 10. The linear axis of the second valve 16, the linear axis of the second outlet aperture 12 and the linear axis of the second valve stem 17 are collinear. The linear axis of the second outlet aperture 12 is orthogonal to the linear axis of the second fluid-delivery aperture 13.

The first expansion-pressure spring 22 is positioned with expansion pressure intermediate the first spring base 23 proximate the activation end of the first valve-stem guide 1 and the first valve 14 for spring-pressing the first valve 14 closed and for allowing predetermined inlet pressure of the first fluid to open the first valve 14.

The second expansion-pressure spring 24 is positioned with expansion pressure intermediate the second spring base 25 proximate the activation end of the second valve-stem guide 2 and the second valve 16 for spring-pressing the second valve 16 closed and for allowing predetermined inlet pressure of the second fluid to open the second valve 16.

The injection activator 19 includes the actuator piston 26 in sliding-seal contact with the inside periphery of the actuator cylinder 27 in the valve housing 3.

The actuator cylinder 27 has a linear axis collinear to and intermediate the first valve-stem guide 1 and the second valve-stem guide 2. The actuator stem 28 is extended perpendicularly from the actuator piston 26 to rigid contact with the actuation T-bar 18;

The actuation-fluid conveyance 29 is in fluid communication with the pressure-actuation end of the actuator cylinder 27. The pressure-actuation end of the actuator cylinder 27 is opposite the stem end of the actuator piston 26 for actuating travel of the activation T-bar 18 in the valve-opening direction.

Referring particularly to FIG. 7 and generally to FIGS. 1-10, the first fluid-supply conveyance 35 is formed and positioned for fluid communication from a first fluid container 36 to the first fluid-supply aperture 5.

A first fluid-injection conveyance 37 is formed and positioned for fluid communication from the first fluid-delivery aperture 8 to a predetermined mixing nozzle 38.

A second fluid-supply conveyance 39 is formed and positioned for fluid communication from a second fluid container 40 to the second fluid-supply aperture 10.

A second fluid-injection conveyance 41 is formed and positioned for fluid communication from the second fluid-delivery aperture 13 to the predetermined mixing nozzle 38.

An actuation-fluid conveyance 42 is formed and positioned for fluid communication from an actuation-pressure source 43 to the actuator cylinder 27.

An actuation on/off solenoid valve 44 is positioned predeterminedly in timing communication intermediate the actuation-pressure source 43 and the actuator cylinder 27.

The actuation-pressure source 43 can include structure for pre-pressured containment of a gas for light-weight and quick-supply needs for racing and other predetermined engine uses.

The actuation on/off solenoid valve 44 can include a low-power electrical system for timed release of gas pressure from the actuation-pressure source 43.

The actuation-pressure source 43 can include structure for onboard pressurization of a gas for heavy-duty needs that include transportation, industrial, working and other predetermined engine uses.

A new and useful nitrous oxide injection valve having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A nitrous oxide and fuel control valve comprising:
   at least one first valve-stem guide and at least one second valve-stem guide in a valve housing;
   a first inlet aperture in fluid communication from a first fluid-supply aperture in the valve housing to a first valve aperture in the valve housing; a first outlet aperture in fluid communication from the first valve aperture to a first fluid-delivery aperture in the valve housing;
   a second inlet aperture in fluid communication from a second fluid-supply aperture in the valve housing to a second valve aperture in the valve housing;
   a second outlet aperture in fluid communication from the second valve aperture to a second fluid-delivery aperture in the valve housing;
   a first valve on a first valve stem;
   the first valve stem being reciprocatable within an internal periphery of the first valve-stem guide;
   the first valve being structured for opening and closing the first outlet aperture with the first valve stem predeterminedly;
   a second valve on a second valve stem;
   the second valve stem being reciprocatable within an internal periphery of the second valve-stem guide;
   the second valve being structured for opening and closing the second outlet aperture with the second valve stem predeterminedly; an activator T-bar proximate activation ends of the first valve stem and the second valve stem;
   an injection activator in communication with the activation T-bar;
   the injection activator being structured for actuating the activator T-bar predeterminedly for actuation of the first valve with the first valve stem and for actuation of the second valve with the second valve stem;
   the first fluid-supply aperture is structured for receiving a first fluid under pressure for directing the first fluid to the first outlet aperture;
   the second fluid-supply aperture is structured for receiving a second fluid under pressure for directing the second fluid to the second outlet aperture;
   the first valve is a poppet valve structured on a valve end of the first valve stem for closing and opening the first outlet aperture predeterminedly; and
   the second valve is a poppet valve structured on a valve end of the second valve stem for closing and opening the second outlet aperture predeterminedly.

2. The nitrous oxide and fuel control valve of claim 1 wherein:
   the injection activator includes an actuator piston in sliding-seal contact with an inside periphery of an actuator cylinder in the valve housing;
   the actuator cylinder has a linear axis collinear to and intermediate the first valve-stem guide and the second valve-stem guide;
   an actuator stem is extended perpendicularly from the actuator piston to rigid contact with the actuation T-bar; and
   an actuation-fluid conveyance is in fluid communication with a pressure-actuation end of the actuator cylinder.

3. The nitrous oxide and fluid control valve of claim 2 wherein:
   the pressure-actuation end of the actuator cylinder is opposite a stem end of the actuator piston for actuating travel of the activation T-bar in a valve-opening direction.

4. The nitrous oxide and fuel control valve of claim 3 wherein:
   the first valve stem and the second valve stem include threads on top ends thereof;
   a first rotary nut and first jam nut are screw-positioned on the threads of the first valve stem to secure the activation T-bar to the first valve stem; and
   a second rotary nut and second jam nut are screw-positioned on the threads of the second valve stem to secure the activation T-bar to the second valve stem.

5. A nitrous oxide and fuel control valve comprising:
   at least one first valve-stem guide and at least one second valve-stem guide in a valve housing;
   a first inlet aperture in fluid communication from a first fluid-supply aperture in the valve housing to a first valve aperture in the valve housing;
   a first outlet aperture in fluid communication from the first valve aperture to a first fluid-delivery aperture in the valve housing;
   a second inlet aperture in fluid communication from a second fluid-supply aperture in the valve housing to a second valve aperture in the valve housing;
   a second outlet aperture in fluid communication from the second valve aperture to a second fluid-delivery aperture in the valve housing;
   a first valve on a first valve stem;
   the first valve stem being reciprocatable within an internal periphery of the first valve-stem guide;
   the first valve being structured for opening and closing the first outlet aperture with the first valve stem predeterminedly;
   a second valve on a second valve stem;
   the second valve stem being reciprocatable within an internal periphery of the second valve-stem guide;
   the second valve being structured for opening and closing the second outlet aperture with the second valve stem predeterminedly;
   an activator T-bar proximate activation ends of the first valve stem and the second valve stem;
   an injection activator in communication with the activation T-bar;
   the first fluid-supply aperture is structured for receiving a first fluid under pressure for directing the first fluid to the first outlet aperture;
   the second fluid-supply aperture is formed to receive a second fluid under pressure for directing the second fluid to the second outlet aperture;
   the first valve is a poppet valve structured on a valve end of the first valve stem for closing and opening the first outlet aperture predeterminedly;
   the second valve is a poppet valve structured on a valve end of the second valve stem for closing and opening the second outlet aperture predeterminedly;
   the linear axis of the first outlet aperture is orthogonal to a linear axis of the first fluid-supply aperture;
   a linear axis of the first valve, the linear axis of the first outlet aperture and a linear axis of the first valve stem are collinear;
   the linear axis of the first outlet aperture is orthogonal to a linear axis of the first fluid-delivery aperture;
   the linear axis of the second outlet aperture is orthogonal to the linear axis of the second fluid-supply aperture;
   a linear axis of the second valve, the linear axis of the second outlet aperture and a linear axis of the second valve stem are collinear;

the linear axis of the second outlet aperture is orthogonal to a linear axis of the second fluid-delivery aperture;

a first expansion-pressure spring is positioned with expansion pressure intermediate a first spring base proximate an activation end of the first valve-stem guide and the first valve for spring-pressing the first valve closed and for allowing predetermined inlet pressure of the first fluid to open the first valve;

a second expansion-pressure spring is positioned with expansion pressure intermediate a second spring base proximate an activation end of the second valve-stem guide and the second valve for spring-pressing the second valve closed and for allowing predetermined inlet pressure of the second fluid to open the second valve;

the injection activator includes an actuator piston in sliding-seal contact with an inside periphery of an actuator cylinder in the valve housing;

the actuator cylinder has a linear axis collinear to and intermediate the first valve-stem guide and the second valve-stem guide;

an actuator stem is extended perpendicularly from the actuator piston to rigid contact with the actuation T-bar;

an actuation-fluid conveyance is in fluid communication with a pressure-actuation end of the actuator cylinder;

the pressure-actuation end of the actuator cylinder is opposite a stem end of the actuator piston for actuating travel of the activation T-bar in a valve-opening direction;

the first valve stem and the second valve stem include threads on activator ends thereof;

a first rotary nut and first jam nut are screw-positioned on the threads of the first valve stem to secure the activation T-bar to the first valve stem; and a second rotary nut and second jam nut are screw-positioned on the threads of the second valve stem to secure the activation T-bar to the second valve stem.

6. A nitrous oxide and fuel control valve comprising:

at least one first valve-stem guide and at least one second valve-stem guide in a valve housing;

a first inlet aperture in fluid communication from a first fluid-supply aperture in the valve housing to a first valve aperture in the valve housing; a first outlet aperture in fluid communication from the first valve aperture to a first fluid-delivery aperture in the valve housing;

a second inlet aperture in fluid communication from a second fluid-supply aperture in the valve housing to a second valve aperture in the valve housing;

a second outlet aperture in fluid communication from the second valve aperture to a second fluid-delivery aperture in the valve housing;

a first valve on a first valve stem;

the first valve stem being reciprocatable within an internal periphery of the first valve-stem guide;

the first valve being structured for opening and closing the first outlet aperture with the first valve stem predeterminedly;

a second valve on a second valve stem;

the second valve stem being reciprocatable within an internal periphery of the second valve-stem guide;

the second valve being structured for opening and closing the second outlet aperture with the second valve stem predeterminedly; an activator T-bar proximate activation ends of the first valve stem and the second valve stem;

an injection activator in communication with the activation T-bar;

the injection activator being structured for actuating the activator T-bar predeterminedly for actuation of the first valve with the first valve stem and for actuation of the second valve with the second valve stem;

a linear axis of the first outlet aperture is orthogonal to a linear axis of the first fluid-supply aperture;

a linear axis of the first valve, the linear axis of the first outlet aperture and a linear axis of the first valve stem are collinear;

the linear axis of the first outlet aperture is orthogonal to a linear axis of the first fluid-delivery aperture;

a linear axis of the second outlet aperture is orthogonal to a linear axis of the second fluid-supply aperture;

a linear axis of the second valve, the linear axis of the second outlet aperture and a linear axis of the second valve stem are collinear;

the linear axis of the second outlet aperture is orthogonal to a linear axis of the second fluid-delivery aperture;

a first expansion-pressure spring is positioned with expansion pressure intermediate a first spring base proximate an activation end of the first valve-stem guide and the first valve for spring-pressing the first valve closed and for allowing predetermined inlet pressure of the first fluid to open the first valve for fluid communication intermediate the first inlet aperture and the first outlet aperture; and a second expansion-pressure spring is positioned with expansion pressure intermediate a second spring base proximate an activation end of the second valve-stem guide and the second valve for spring-pressing the second valve closed and for allowing predetermined inlet pressure of the second fluid to open the second valve for fluid communication intermediate the second inlet aperture and the second outlet aperture.

7. The nitrous oxide and fuel control valve of claim 6 wherein:

the injection activator includes an actuator piston in sliding-seal contact with an inside periphery of an actuator cylinder in the valve housing;

the actuator cylinder has a linear axis collinear to and intermediate the first valve-stem guide and the second valve-stem guide;

an actuator stem is extended perpendicularly from the actuator piston to rigid contact with the actuation T-bar; and an actuation-fluid conveyance is in fluid communication with a pressure-actuation end of the actuator cylinder.

8. The nitrous oxide and fluid control valve of claim 7 wherein:

the pressure-actuation end of the actuator cylinder is opposite a stem end of the actuator piston for actuating travel of the activation T-bar in a valve-opening direction.

9. The nitrous oxide and fuel control valve of claim 8 wherein:

the first valve stem and the second valve stem include threads on top ends thereof;

a first rotary nut and first jam nut are screw-positioned on the threads of the first valve stem to secure the activation T-bar to the first valve stem; and a second rotary nut and second jam nut are screw-positioned on the threads of the second valve stem to secure the activation T-bar to the second valve stem.

10. The nitrous oxide and fuel control valve as in any one of the preceding claims in which:

a first fluid-supply conveyance is structured and positioned for fluid communication from a first fluid container to the first fluid-supply aperture;

a first fluid-injection conveyance is structured and positioned for fluid communication from the first fluid-delivery aperture to a predetermined mixing nozzle;

a second fluid-supply conveyance is structured and positioned for fluid communication from a second fluid container to the second fluid-supply aperture; and a second fluid-injection conveyance is structured and positioned for fluid communication from the second fluid-delivery aperture to the predetermined mixing nozzle.

11. The nitrous oxide and fuel control valve of claim 10 wherein:

an actuation-fluid conveyance is structured and positioned for fluid communication from an actuation-pressure source to the actuator cylinder; and an actuation on/off solenoid valve is positioned predeterminedly in fluid communication intermediate the actuation-pressure source and the actuator cylinder.

12. The nitrous oxide and fuel control valve of claim 11 wherein:

the actuation-pressure source includes structure for pre-pressured containment of a gas for light-weight uses.

13. The nitrous oxide and fuel control valve of claim 12 wherein:

the actuation on/off solenoid valve includes a low-power electrical system for timed release of gas pressure from the actuation-pressure source.

14. The nitrous oxide and fuel control valve of claim 11 wherein:

the actuation on/off solenoid valve includes a low-power electrical system for timed release of gas pressure from the actuation-pressure source.

15. The nitrous oxide and fuel control valve of claim 11 in which:

the actuation-pressure source includes structure for onboard pressurization of a gas for heavy-duty uses.

16. The nitrous oxide and fuel control valve of claim 15 in which:

the actuation on/off solenoid valve includes a heavy-duty electrical system for long-term timing of release of gas pressure from the actuation-pressure source.

17. The nitrous oxide and fuel control valve of claim 11 wherein:

the actuation on/off solenoid includes a heavy-duty electrical system for long-term timing of release of gas pressure from the actuation-pressure source.

* * * * *